United States Patent

Uchida et al.

[11] Patent Number: 6,070,496
[45] Date of Patent: Jun. 6, 2000

[54] METHOD AND APPARATUS FOR CRANKPIN PHASE INDEXING

[75] Inventors: Hiroyuki Uchida; Yukio Kokaji, both of Toyama-ken, Japan

[73] Assignee: Nippei Toyama Corporation, Japan

[21] Appl. No.: 09/066,431

[22] PCT Filed: Nov. 11, 1996

[86] PCT No.: PCT/JP96/03307

§ 371 Date: Aug. 17, 1998

§ 102(e) Date: Aug. 17, 1998

[87] PCT Pub. No.: WO98/21007

PCT Pub. Date: May 22, 1998

[51] Int. Cl.[7] .................................................. B23B 29/24
[52] U.S. Cl. ................. 74/813 R; 451/399; 451/403; 82/106; 82/109; 409/221
[58] Field of Search .................. 74/813 R, 816, 74/813 L; 82/106, 109; 29/6.01; 409/200, 201, 221, 224; 451/403, 399, 62, 251, 249

[56] References Cited

U.S. PATENT DOCUMENTS

| | | | |
|---|---|---|---|
| 3,583,108 | 6/1971 | Oishi et al. | 451/399 |
| 3,680,876 | 8/1972 | Okada | 82/109 X |
| 4,023,937 | 5/1977 | Smith | 451/399 |
| 4,297,926 | 11/1981 | Russ et al. | 82/106 |
| 5,189,846 | 3/1993 | Griswold | 451/399 X |
| 5,303,511 | 4/1994 | Tsuchiya et al. | 451/399 X |
| 5,700,186 | 12/1997 | Hykes et al. | 451/399 X |

FOREIGN PATENT DOCUMENTS

| | | |
|---|---|---|
| 51-51080 | 5/1976 | Japan . |
| 56-28811 | 3/1981 | Japan . |
| 58-80150 | 5/1983 | Japan . |
| 58-121638 | 8/1983 | Japan . |
| 59-132749 | 9/1984 | Japan . |
| 7-88709 | 4/1995 | Japan . |

*Primary Examiner*—David A. Bucci
*Assistant Examiner*—Brandon C. Stallman
*Attorney, Agent, or Firm*—D. Peter Hochberg; William H. Holt

[57] ABSTRACT

A chuck (25) for chucking a journal (271) of a crankshaft (27) is attached to the distal end of a main spindle (22) rotated by a drive motor. A phasing rotary shaft (53) is connected to the chuck (25) to rotate about an axis offset from the axis of the main spindle (22). The chuck (25) is provided with a coupling (63) that releasably connects the phasing rotary shaft (53) and the chuck (25). Further, a locking mechanism for locking the phasing rotary shaft (53) is provided. The coupling (63) has a pair of coupling plates (64 and 65) that can be moved closer to and farther from each other. Opposing faces of these coupling plates (64 and 65) have teeth (641 and 651), which are meshed when the coupling plates (64 and 65) are brought close to each other.

14 Claims, 14 Drawing Sheets

METHOD AND APPARATUS FOR CRANKPIN PHASE INDEXING

BACKGROUND OF THE INVENTION

The present invention relates to a crank pin phase indexing apparatus and an indexing method, which are employed in crank pin grinding machines and the like.

Japanese Unexamined Patent Publication No. Hei 3-19757 discloses a known crank pin phase indexing apparatus having a pair of main spindles. In this prior art indexing apparatus, a chuck body is attached to the nose of each main spindle, and the chuck supports a phasing rotary shaft rotatable about an axis offset from the axis of the main spindle. A phase indexing shaft is supported in the main spindle along the center thereof to rotate relative to the main spindle on the same axis, and the distal end of the phase indexing shaft is connected to the phasing rotary shaft via a first coupling.

A second coupling is located between the main spindle and the phase indexing shaft and releasably connects them. A differential gear mechanism is located between a drive motor and the main spindle and phase indexing shaft, and the main spindle and the phase indexing shaft are rotated, with the rotation of the drive motor, integrally or relative to each other via the differential gear mechanism. Further, a braking mechanism is connectable either to the main spindle or the phase indexing shaft.

Indexing of a work crankshaft with respect to the axis of the main spindle is carried out after the second coupling is disengaged from the main spindle and after the main spindle is engaged with the braking mechanism. Since the main spindle is locked against rotation in this state, if the drive motor is driven, the phase indexing shaft is rotated relative to the main spindle via the differential gear mechanism. This rotation of the phase indexing shaft is transmitted to the phasing rotary shaft to achieve indexing of the workpiece supported by the chuck body at a predetermined phase with respect to the center of the workpiece.

When the main spindle is to be rotated, the second coupling is engaged with the main spindle and the braking mechanism is disengaged from the main spindle. Since the main spindle and the phase indexing shaft are connected to each other integrally in this state, the main spindle and the phase indexing shaft are rotated integrally via the differential gear mechanism when the drive motor is driven. Thus, the workpiece supported by the chuck bodies is rotated on the axis of the main spindle with a predetermined indexed phase. The workpiece chucked by the chuck body is rotated and machined.

However, in this prior art crank pin phase indexing apparatus, a differential gear mechanism is located between the drive motor and the main spindle and phase indexing shaft, and the main spindle and the phase indexing shaft are rotated via this differential gear mechanism integrally or relative to each other for machining or indexing. Accordingly, a differential gear mechanism having a multiplicity of gears must be incorporated into the apparatus, which complicates the apparatus, degrades the working environment with gear beating noise and lowers the accuracy of the apparatus due to abrasion of the gears.

BRIEF SUMMARY OF THE INVENTION

The present invention was accomplished in view of the problems inherent in the prior art, and it is an objective of the invention to provide a crank pin phase indexing apparatus that has a simple constitution, a small size as a whole and can accurately index workpieces at predetermined phases. It is another objective of the present invention to prevent degradation of the working environment by gear beating noises. It is a further objective of the present invention to ensure clamping of workpieces and to carry out accurate and smooth phase indexing of workpieces.

To attain the objectives described above, the present invention is provided with a chuck for chucking a workpiece at the nose of each main spindle, which is rotated by a drive motor. The chuck is connected to a phasing rotary shaft, which is rotatable about an axis offset from the axis of the main spindle. A coupling is located between the phasing rotary shaft and the chuck, and locking means for locking the phasing rotary shaft against rotation is also provided.

When a crankshaft is to be indexed, the coupling is disengaged and the locking means is actuated. Since the phasing rotary shaft is locked against rotation in this state, the chuck body is rotated relative to the phasing rotary shaft and is also rotated on the main spindle when the main spindle is rotated by the drive motor. Thus, the crankshaft supported by the chuck body is indexed to a predetermined phase while it maintains the posture it had before indexing relative to the axis of the main spindle.

Then, the main spindle is rotated, the coupling is engaged and the locking means is deactuated. Since the chuck body and the phasing rotary shaft are connected integrally to each other in this state, the chuck body and the phasing rotary shaft are rotated integrally when the main spindle is rotated by the drive motor. Thus, the crankshaft, which is supported by the chuck body, is rotated on the axis of the main spindle while it maintains a predetermined indexed phase.

Further, in the present invention, the coupling is a Curvic coupling having a pair of coupling plates, which can be moved closer to and farther from each other. Opposing faces of these coupling plates have teeth that can be meshed with their counterparts when the coupling plates are moved close to each other.

Therefore, since a Curvic coupling having teeth and tooth spaces, which are brought together, constitutes the coupling between the phasing rotary shaft and the chuck in the present invention, connection of the phasing rotary shaft with the chuck is secure. Since the Curvic coupling is designed such that the teeth thereof each have a trapezoidal cross section and that the tooth spaces each have a triangular or trapezoidal cross section, the accuracy of meshing between the teeth and tooth spaces is improved. In addition, since the Curvic coupling is located between the phasing rotary shaft and the front end of the chuck, the rotation of the main spindle is transmitted directly to the chuck during machining, which contributes to high-accuracy machining.

DETAILED DESCRIPTION OF THE PREFERRED EMBODIMENT

Figure 1:
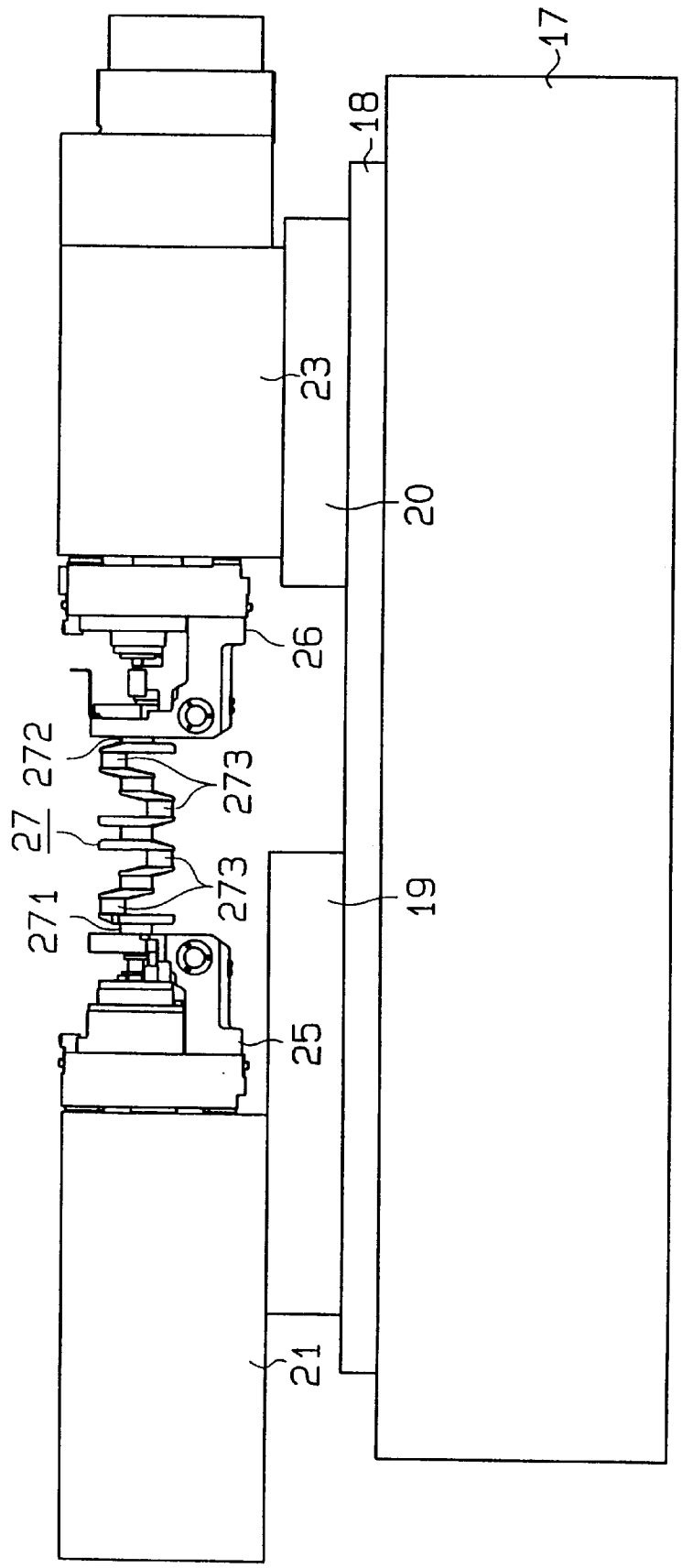
FIG. 1 is a front view showing a crank pin phase indexing apparatus according to one embodiment of the present invention.

As shown in FIG. 1, a bed 17 has on its upper surface a slide base 18 carrying a pair of saddles 19 and 20. One saddle 19 is fixed, and the other saddle 20 is slidable crosswise on the slide base 18.

Figure 2:
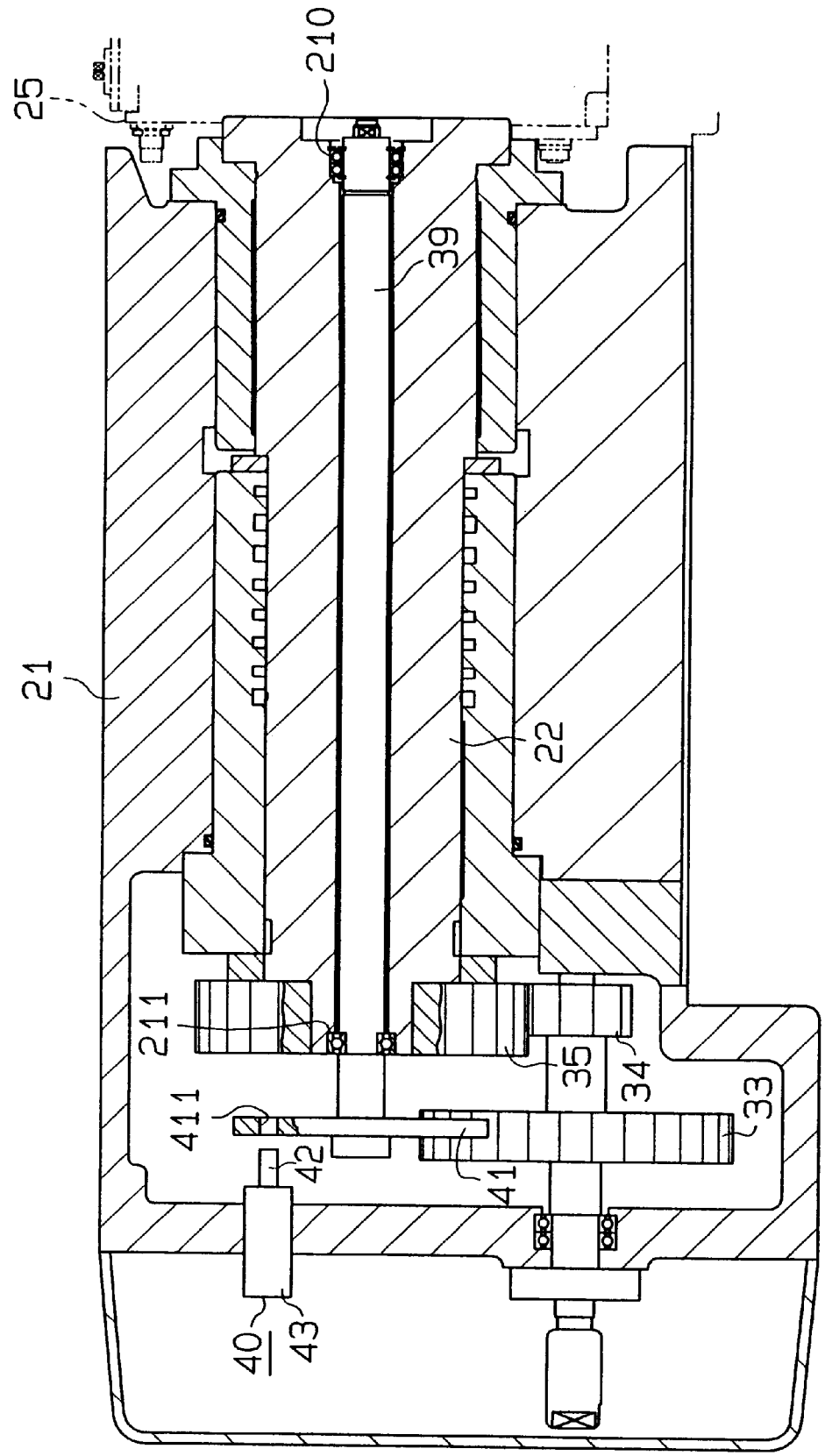
FIG. 2 is an enlarged vertical cross-sectional view of a major section showing a headstock.

A drive side head 21, which is mounted on one saddle 19, rotatably supports a cylindrical main spindle 22, as shown in FIG. 2. A driven side head 23, which is mounted on the other saddle 20 to oppose the drive side head 21, rotatably supports a cylindrical main spindle 24, as shown in FIG. 5.

Figure 5:
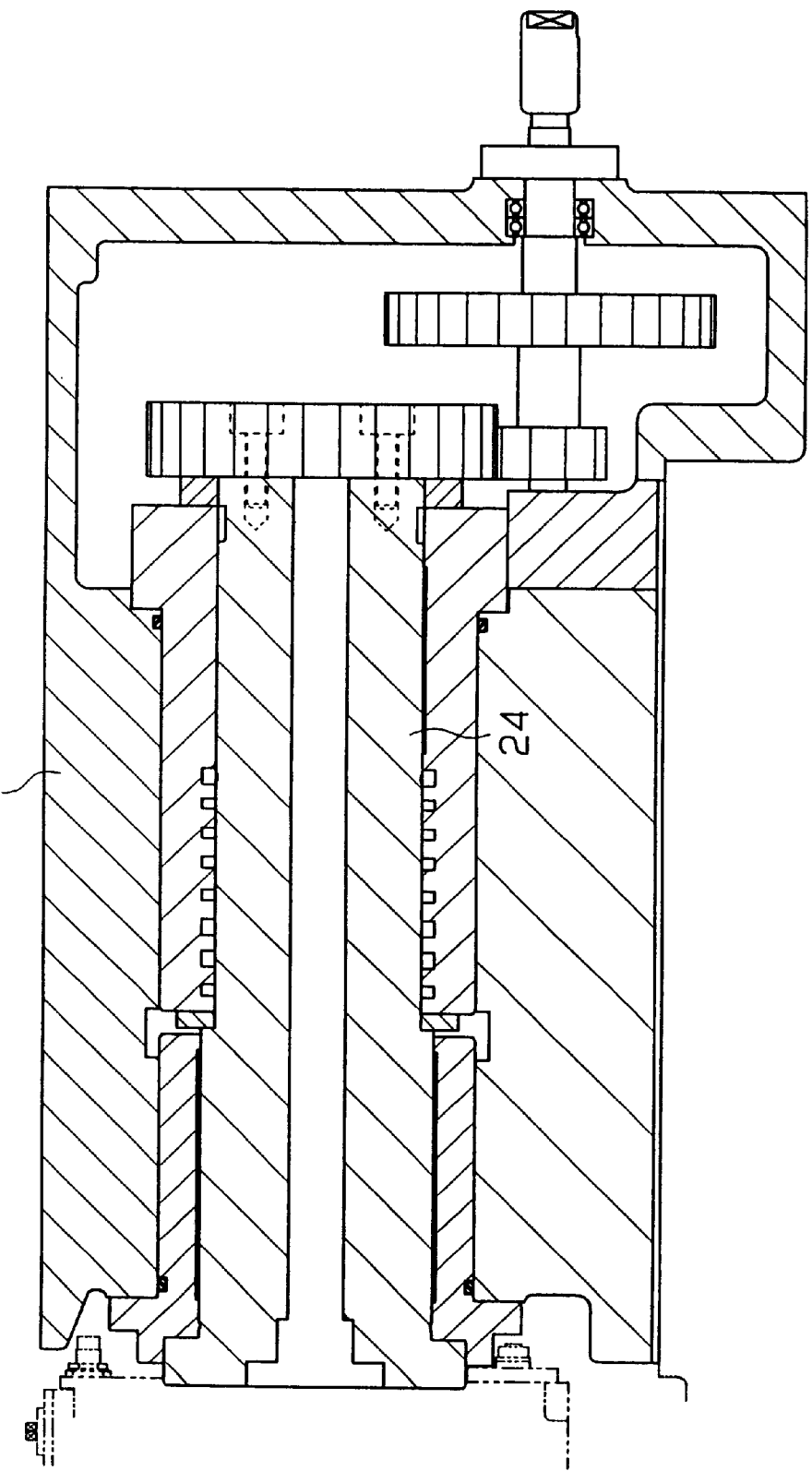
FIG. 5 is an enlarged vertical cross-sectional view of a major section showing a tailstock.

As shown in FIGS. 1, 2 and 5, a first chuck body 25 is attached to the nose of the main spindle 22 in the drive side head 21, and a second chuck body 26 is attached to the nose of the main spindle 24 in the driven side head 23 to oppose the first chuck body 25.

Figure 13:
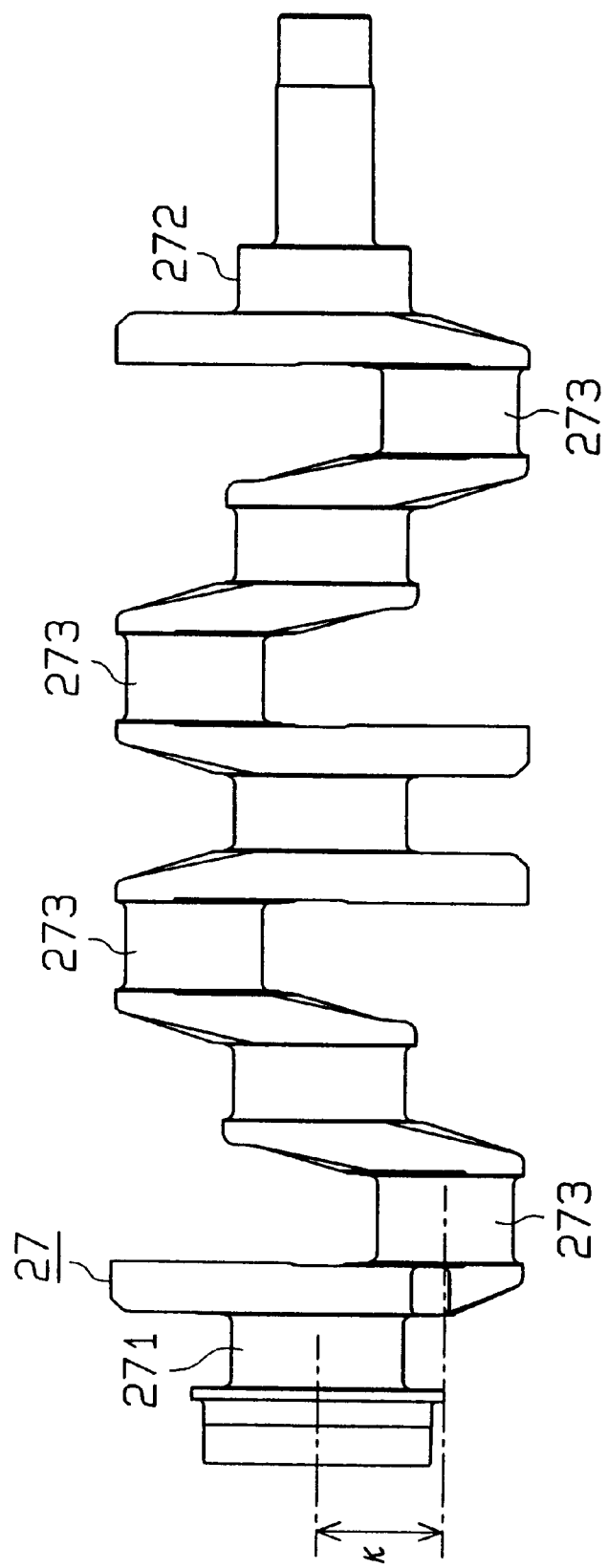
FIG. 13 is an enlarged front view of a crankshaft.

As shown in FIGS. 1 and 13, a work crankshaft 27 has journals 271 and 272 at both end portions and a plurality of crank pins between the journals 271 and 272. The journals 271 and 272 are aligned on the same axis, and the crank pins 273 are arranged around the axis of the journals 271 and 272 at regular phase intervals. The crankshaft 27 is chucked between the chuck bodies 25 and 26 at both end journals 271 and 272.

The space between the drive head 21 and the driven head 23 is adjusted by moving the saddle 20, depending on the length of the crankshaft 27.

Figure 3:
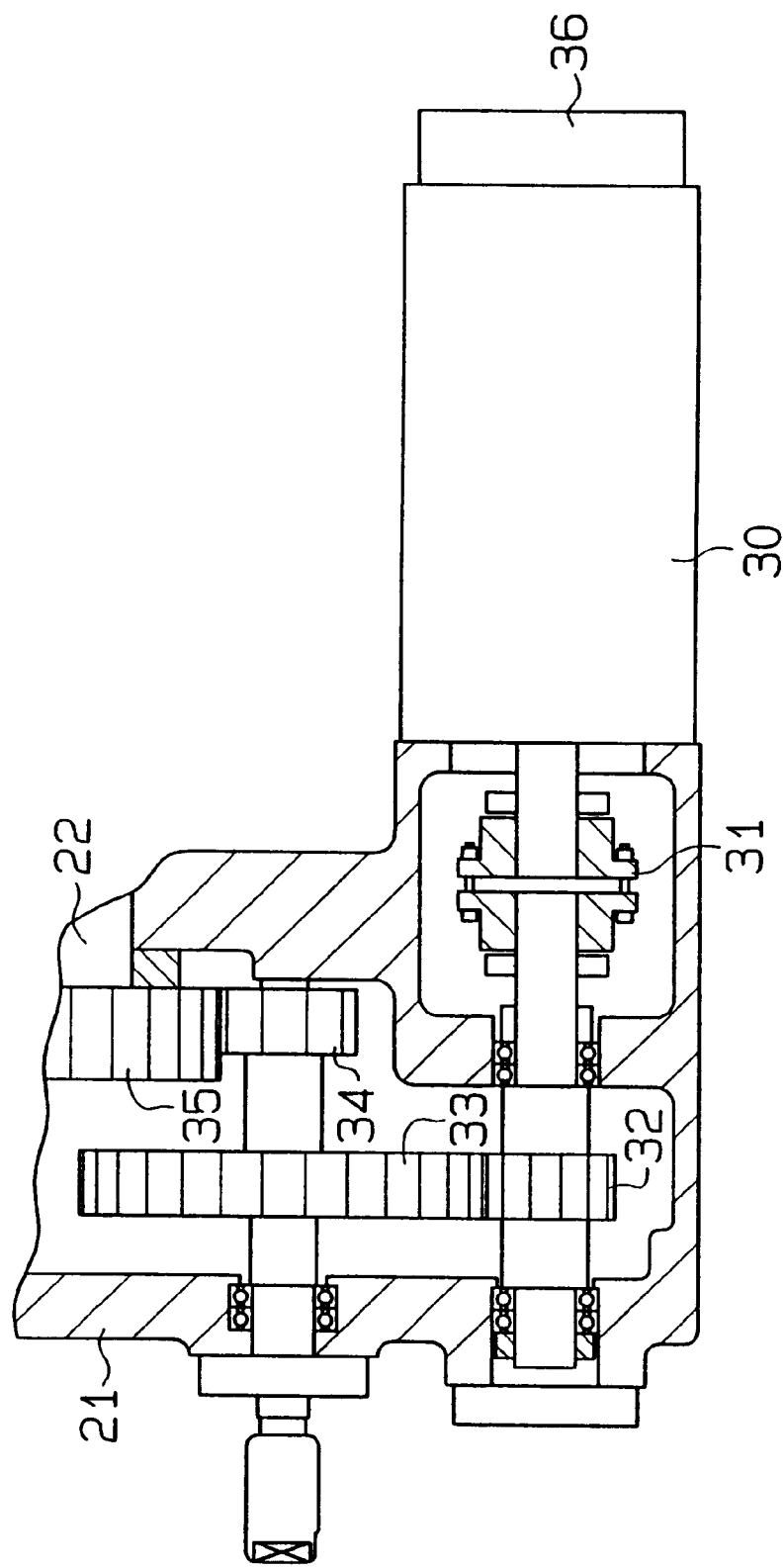
FIG. 3 is an enlarged horizontal cross-sectional view of the major section showing drive motor in the headstock.

As shown in FIGS. 2 and 3, a first drive motor 30 is provided in the drive side head 21, and the main spindle 22 is rotated via a coupling 31 and a plurality of gears 32, 33, 34 and 35 by the rotation of the first drive motor 30. An encoder 36 is housed in the drive motor 30 and detects the rotational position of the main spindle 22 and synchronism of the main spindle 22 with respect to the main spindle 24.

As shown in FIG. 2, a phase indexing shaft 39, forming part of the locking means, is supported via a pair of bearings 210 and 211 in the main spindle 22 to share the axis of the bearings 210, 211 to rotate relative to the main spindle 22, and a locking mechanism 40, also forming part of the locking means, is attached to the rear end of the shaft 39. This locking mechanism 40 is provided with a locking disc 41 fixed to the rear end portion of the phase indexing shaft 39, a locking pin 42 which is engageable with a plurality of engaging holes 411, and a locking cylinder 43 for engaging and disengaging the locking pin 42 with and from the locking holes 411. When the locking pin 42 is advanced to a position where it engages with the engaging holes 411 of the locking disc 41 by the locking cylinder 43, the phase indexing shaft 39 is non-rotatably locked.

Figure 4:
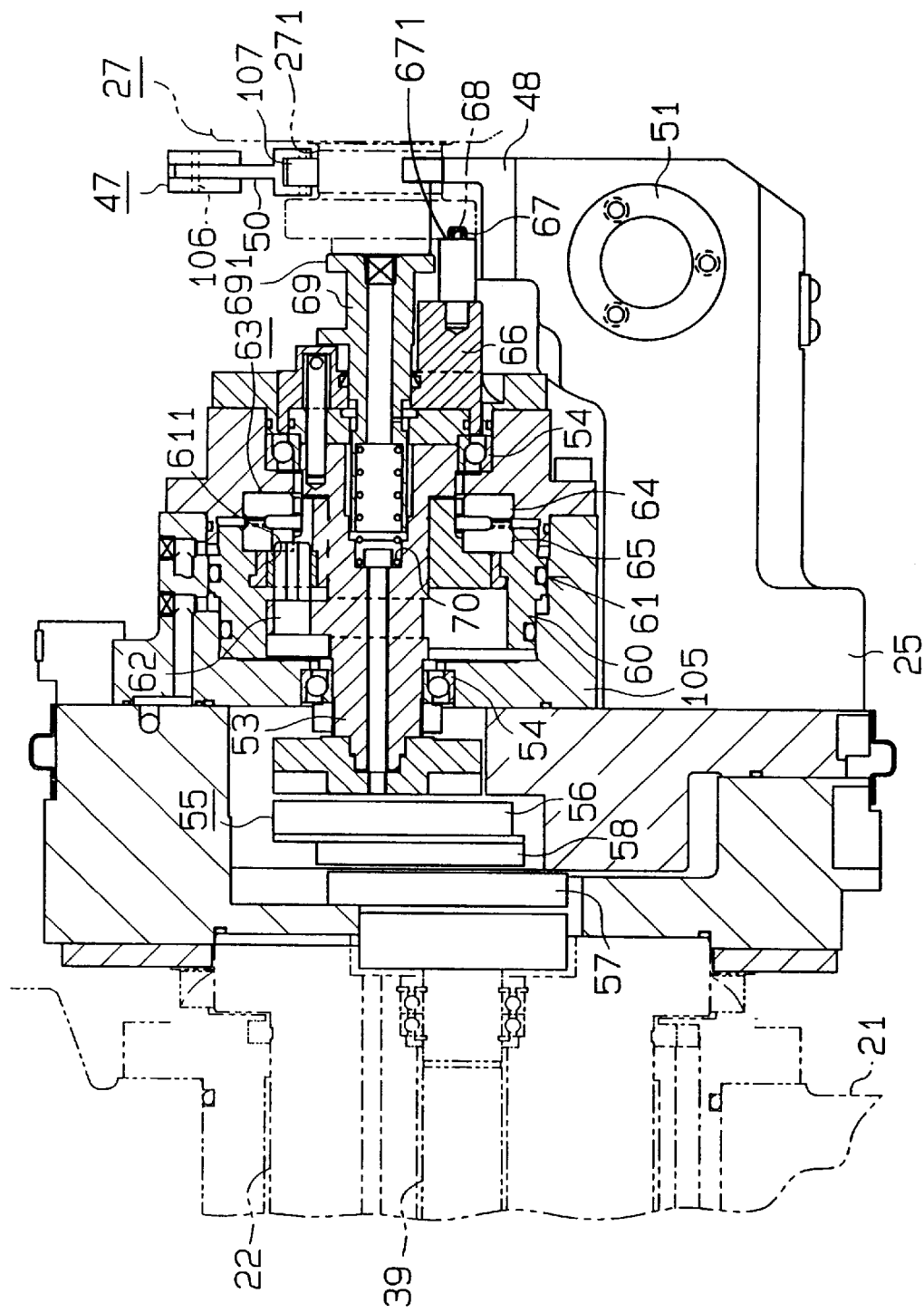
FIG. 4 is an enlarged vertical cross-sectional view of the major section showing a chuck in the headstock.
Figure 8:
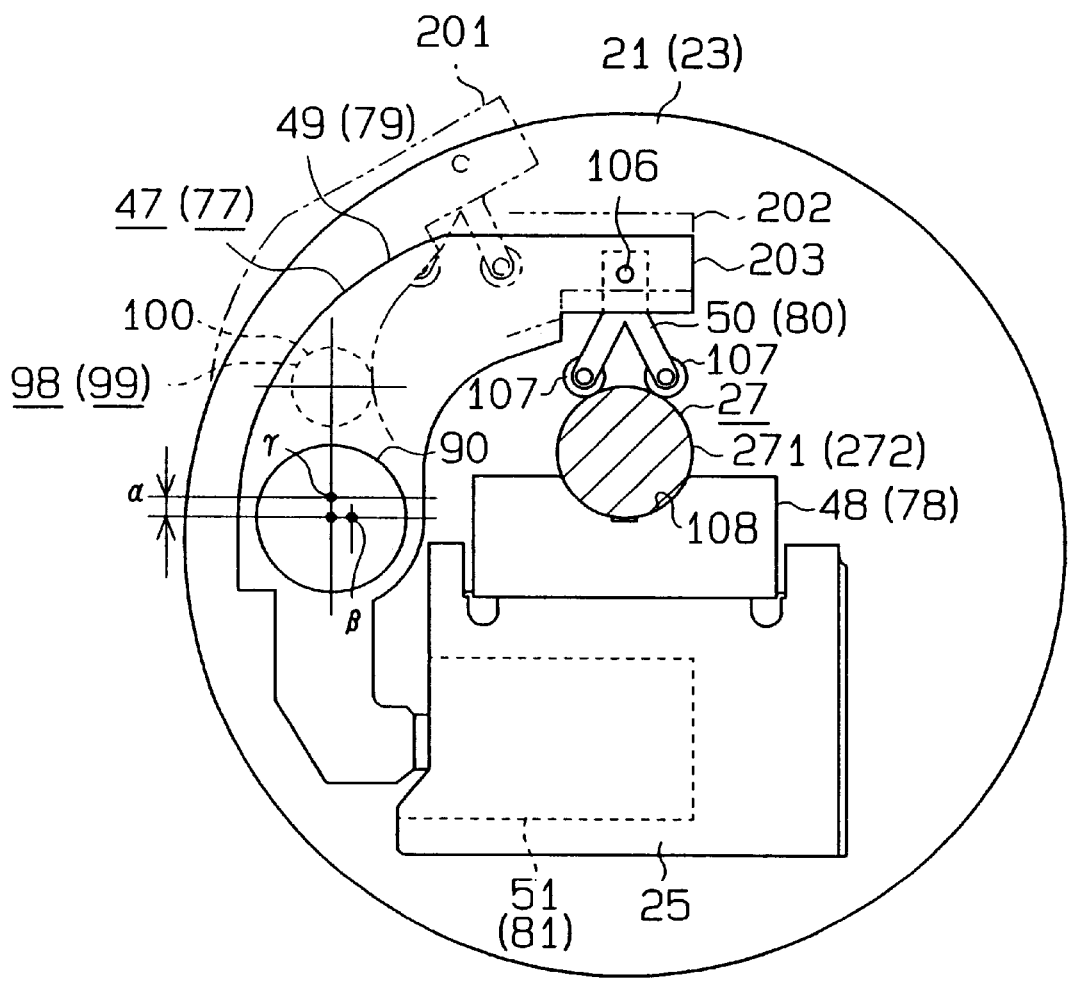
FIG. 8 is side view of the chuck.
Figure 9:
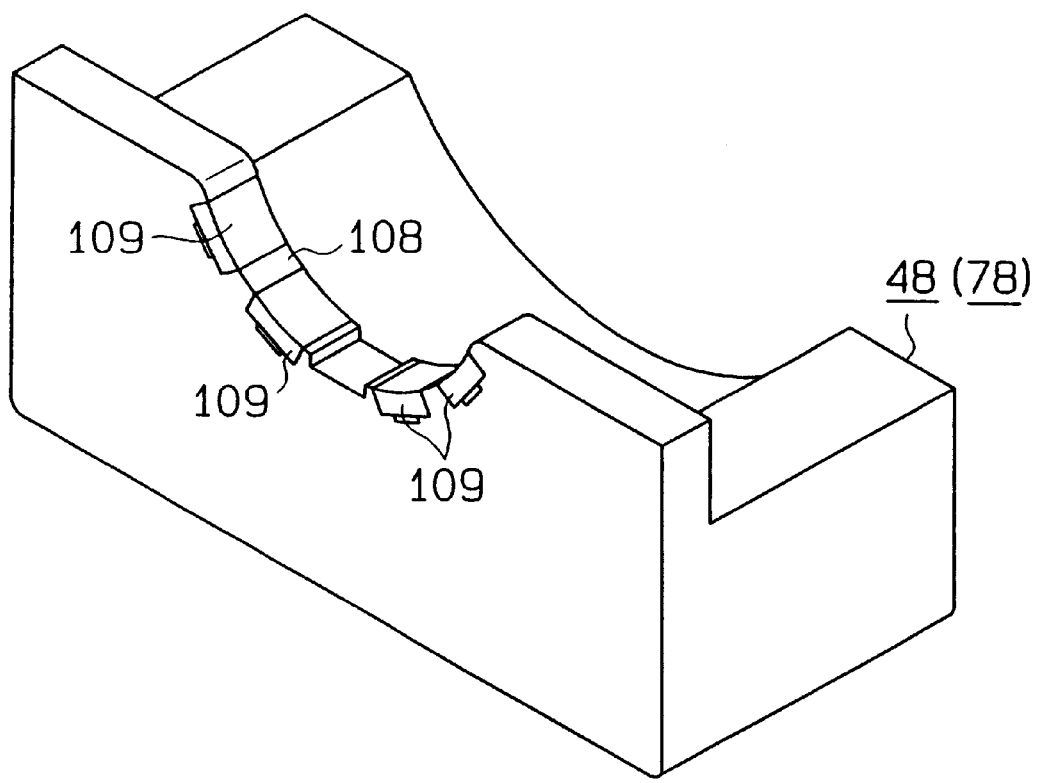
FIG. 9 is an enlarged perspective view of a fixed clamp member.

As shown in FIG. 4, the first chuck body 25 is made of a light-weight metallic material such as high-tension aluminum and has a clamping device 47 at its front end. As shown in FIGS. 8 and 9, this clamping device 47 is equipped with a fixed clamp member 48 fixed on the first chuck 25, a pivotal arm 49 pivotally attached to the first chuck 25 with a pivot 90, a movable clamp member 50 attached to the distal end portion of the pivotal arm 49, a clamping cylinder 51 for pivoting the pivotal arm 49, and a pivot turning device 98. The movable clamp member 50 is attached to the distal end portion of the pivotal arm 49 such that the clamp member 50 can swivel about a shaft 106. The movable clamp member 50 is forked to have two fingers, and a roller 107 is supported at the distal end portion of each finger to roll freely.

When the pivotal arm 49 is turned clockwise in FIG. 8 on the pivot 90 by the clamping cylinder 51, the journal 271 or 272 of the crankshaft 27 is clamped between the fixed clamp member 48 and the rollers 107 of the movable clamp member 50 at a position offset by the radius of gyration κ of a crank pin 273 from the axis of the main spindle 22. When the pivotal arm 49 is turned counterclockwise by the clamping cylinder 51 in FIG. 8, the journals 271 or 272 of the crankshaft 27 are unclamped by the clamp members 48 and 50.

Figure 10:
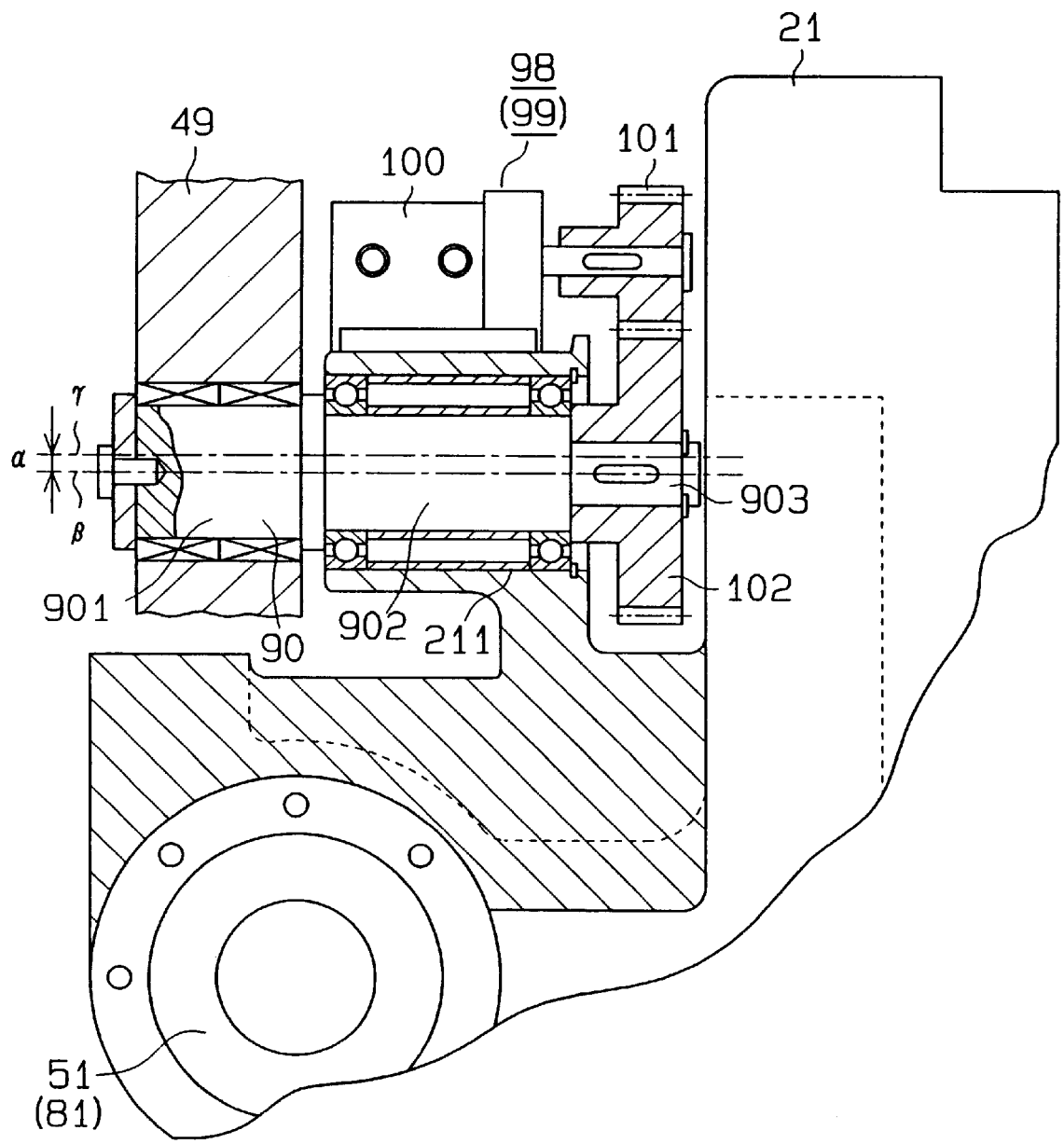
FIG. 10 is an enlarged cross-sectional view of a clamping mechanism in the chucking device of the headstock.

As shown in FIG. 10, the pivot 90 is supported at a medium-diameter portion 902 thereof via a bearing in a pivot supporting hole 211 defined in the chuck 25, and a large-diameter portion 901 of the pivot 90 rotatably supports the pivotal arm 49. The large-diameter portion 901 of the pivot 90 is offset by the distance a relative to the medium-diameter portion 902. The pivot 90 is turned via a gear 101 attached to a motor 100 of the pivot turning device 98 and a gear 102 attached to a small-diameter portion 903 of the pivot 90. If the pivot 90 is turned by 90 degrees by the motor 100 when the movable clamp member 50 is pressing the journal 271, the center β of the large-diameter portion 901 is shifted to the point γ, and thus the pivotal arm 49 is moved upward in FIG. 8 by the eccentric distance α to move the clamp member 50 slightly away from the journal 271 to the position 202 shown in FIG. 8. Although the distance α is magnified in the drawings for easier understanding, the distance is actually very small, such as about 0.2 mm.

As shown in FIG. 9, the fixed clamp member 48 has an arcuate journal receiving face 108 which is hardened and is embedded with a plurality of chips 109 made of a hard metal. The chips 109 also constitute the receiving face 108.

As shown in FIG. 4, a movable piece 105 is located in the first chuck body 25 to move in a radial direction with respect to the axis of the main spindle 22. A phasing rotary shaft 53 is supported rotatably by the movable piece 105 via a pair of bearings 54 to be able to move in the radial direction closer to and farther from the axis of the main spindle 22 as the movable piece 105 moves. A link coupling, or Schmidt coupling (trade name) 55, is located between the phasing rotary shaft 53 and the phase indexing shaft 39 so that the phasing rotary shaft 53 can be aligned with the journal 271 of the crankshaft 27, which is clamped by the clamping device 47. The phasing rotary shaft 53 and the phase indexing shaft 39 are connected to each other via this Schmidt coupling 55, and the phasing rotary shaft 53 is adapted to be turned together with the phase indexing shaft 39 in the same direction by the same angle.

Figure 11:
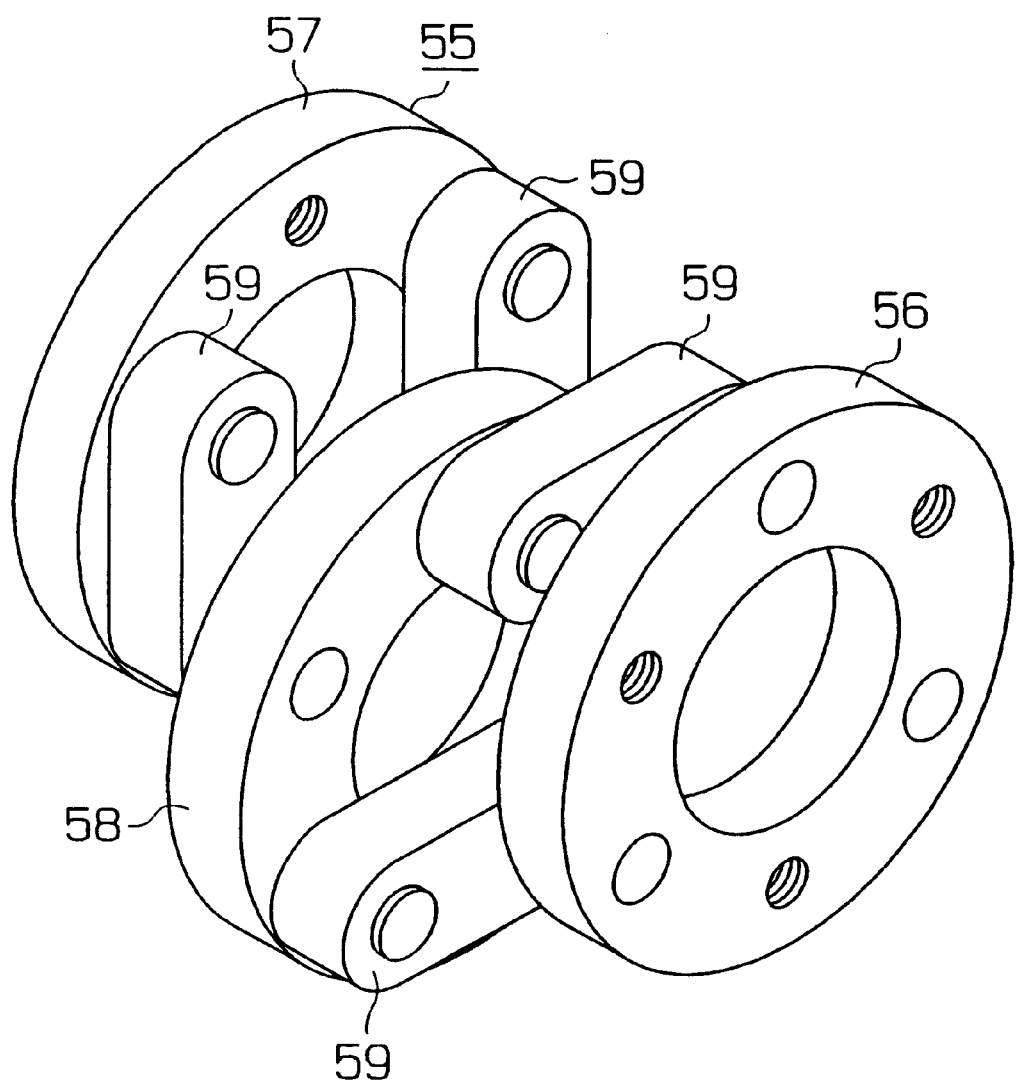
FIG. 11 is an enlarged perspective view of a Schmidt coupling.

As shown in FIG. 11, the Schmidt coupling 55 consists of a pair of end discs 56 and 57, an intermediate disc 58 between these two end discs 56 and 57, and two pairs of links 59, which connect the intermediate disc 58 with the end discs 56 and 57, respectively. When the phase indexing shaft 39 is locked against rotation by the locking mechanism 40, the phasing rotary shaft 53 is also locked via the Schmidt coupling 55. In this state, the first chuck body 25 is rotated relative to the phasing rotary shaft 53 with the rotation of the main spindle 22.

As shown in FIGS. 4 and 11, the disk 56 has an axis, which serves as an input-side axis. Also, the disk 57 has an axis, which serves as an output-side axis. The link coupling 55 permits variation of the distance between the input-side axis and the output-side axis.

As shown in FIG. 4, the first chuck body 25 contains a disengaging cylinder 61 such that its housing surrounds the phasing rotary shaft 53, and a piston 60 is movably contained in the cylinder 61. A connecting pin 62 protrudes from the circumference of the phasing rotary shaft 53 to be parallel to the axis of the shaft 53. An engaging portion is provided, at the distal end portion of the pin 62, to engage with an engaging hole 611 formed on the piston 60.

Figure 12:
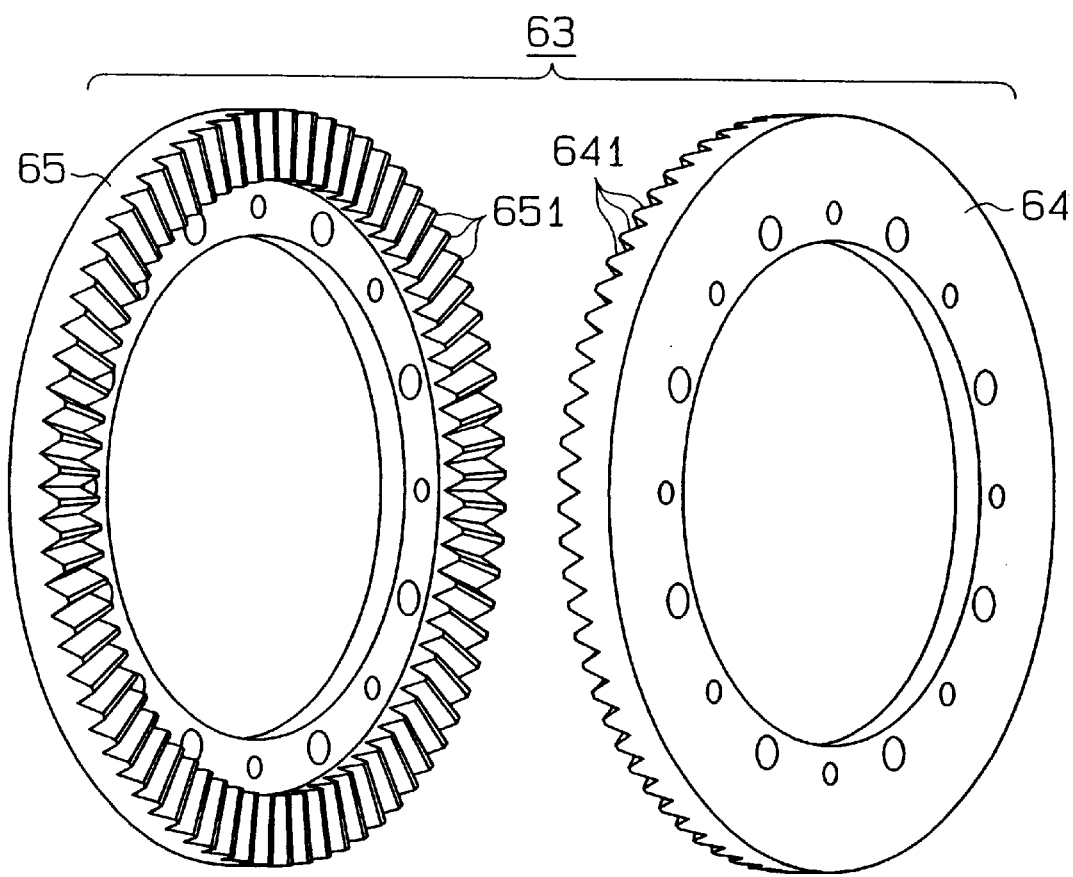
FIG. 12 is an enlarged perspective view of a Curvic coupling.

As shown in FIGS. 4 and 12, a Curvic coupling (trade name) 63, which is a meshing coupling, is located between the first chuck body 25 and the piston 60 so that it is positioned between the phasing rotary shaft 53 and the front end of the first chuck body 25. This Curvic coupling 63 has a coupling plate 64 fixed to the first chuck body 25 and a coupling plate 65 fixed to the piston 60. Teeth 641 and teeth 651, which engage with each other, are formed on the opposing faces of these coupling plates 64 and 65, respectively. The teeth 641 and 651 each have a trapezoidal cross section. Further, triangular spaces are defined between the teeth 641 and between the teeth 651, respectively, so that the tooth spaces between the teeth 641 (651) can accommodate the teeth 651 (641) in a male-female relationship.

When the piston 60 is advanced toward the front end side of the first chuck body 25, the teeth 641 of the coupling plate 64 mesh intimately with the teeth 651 of the coupling plate 65, and the first chuck body 25 and the phasing rotary shaft 53 are connected integrally via the piston 60, the engagement between the engaging hole 611 and the connecting pin 62, and the Curvic coupling 63. When the piston 60 is retracted toward the rear end side of the first chuck body 25, the teeth 641 of the coupling plate 64 are disengaged from the teeth 651 of the coupling plate 65 to disconnect the first chuck body 25 from the phasing rotary shaft 53.

As shown in FIG. 4, a connector 66 is connected to the front end of the phasing rotary shaft 53 to be rotatable integrally therewith. An engaging pin 67 having a seat 671 protrudes from the front end of the connector 66. The crankshaft 27 is connected to the phasing rotary shaft 53 to be rotatable integrally therewith when the engaging pin 67 is engaged with an engaging hole 68 formed on the end face of the journal 271 of the crankshaft 27.

A restrictor 69 is located in a recess defined at the front end of the phasing rotary shaft 53 to be axially movable, which is to the right and left, in FIG. 4, and is urged by a spring 70 in the protruding direction, which is to the right in the drawing. When the journal 271 of the crankshaft 27 is clamped by the clamping device 47 located on the first chuck body 25, the end face of the journal 271 is abutted against the engaging pin 67 with the aid of the spring 70 of the restrictor 69 to be restricted at a predetermined axial position.

Figure 6:
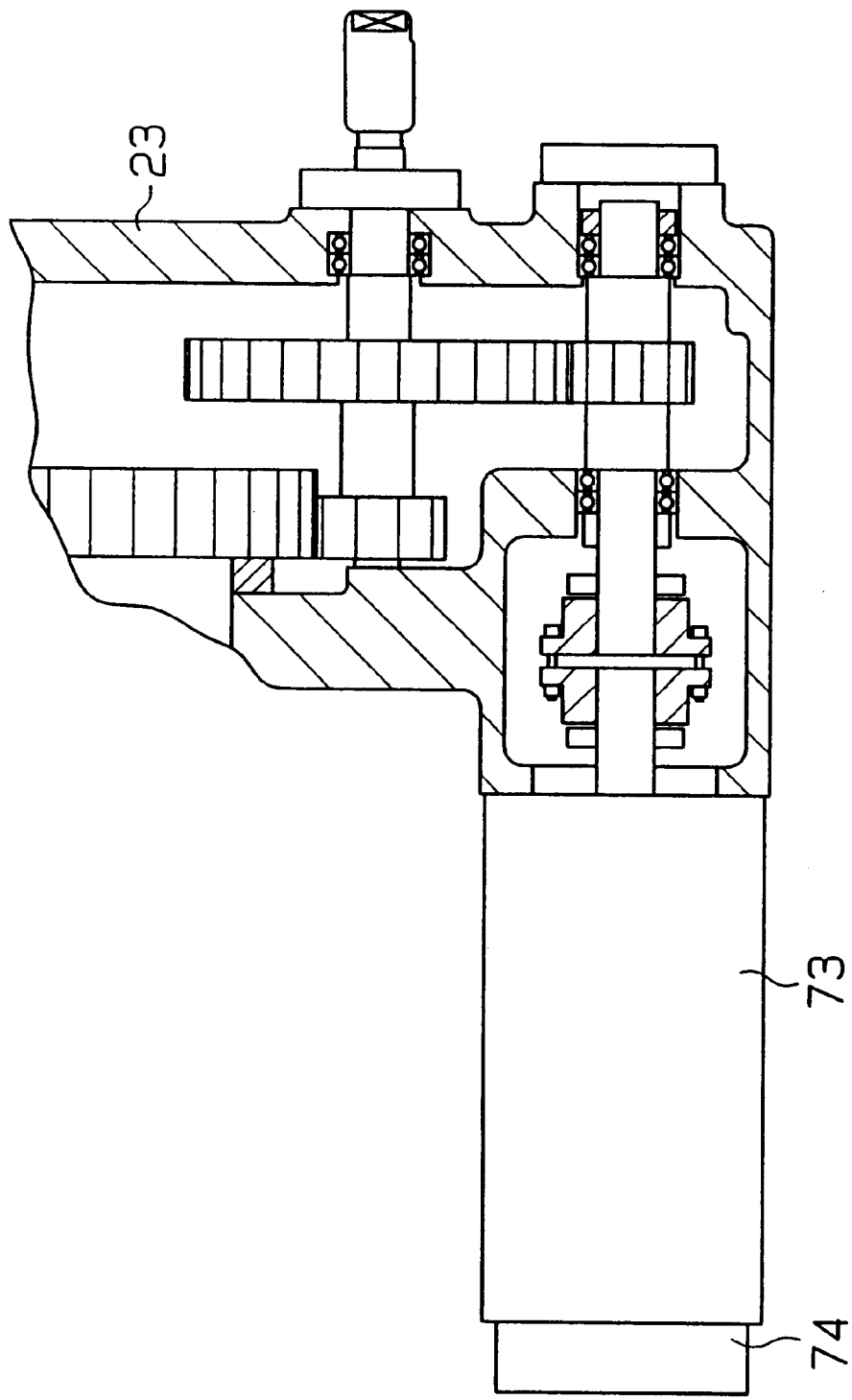
FIG. 6 is an enlarged vertical cross-sectional view of the major section showing a drive motor in the tailstock.

As shown in FIGS. 5 and 6, a drive mechanism for the driven side head 23 is the same as that of the drive side head 21. Accordingly, the driven side head 23 includes members corresponding to various members in the drive side head 21 including a second drive motor 73 and an encoder 74 corresponding to the first drive motor 30 and encoder 36, respectively, a main spindle 24 corresponding to the main spindle 22, and other members corresponding those in the drive side head 21, excluding the phase indexing shaft 39 and the locking mechanism 40. The second drive motor 73 is driven synchronously with the first drive motor 30 to rotate the main spindle 24 at the same speed and in the same direction as the main spindle 22.

Figure 7:
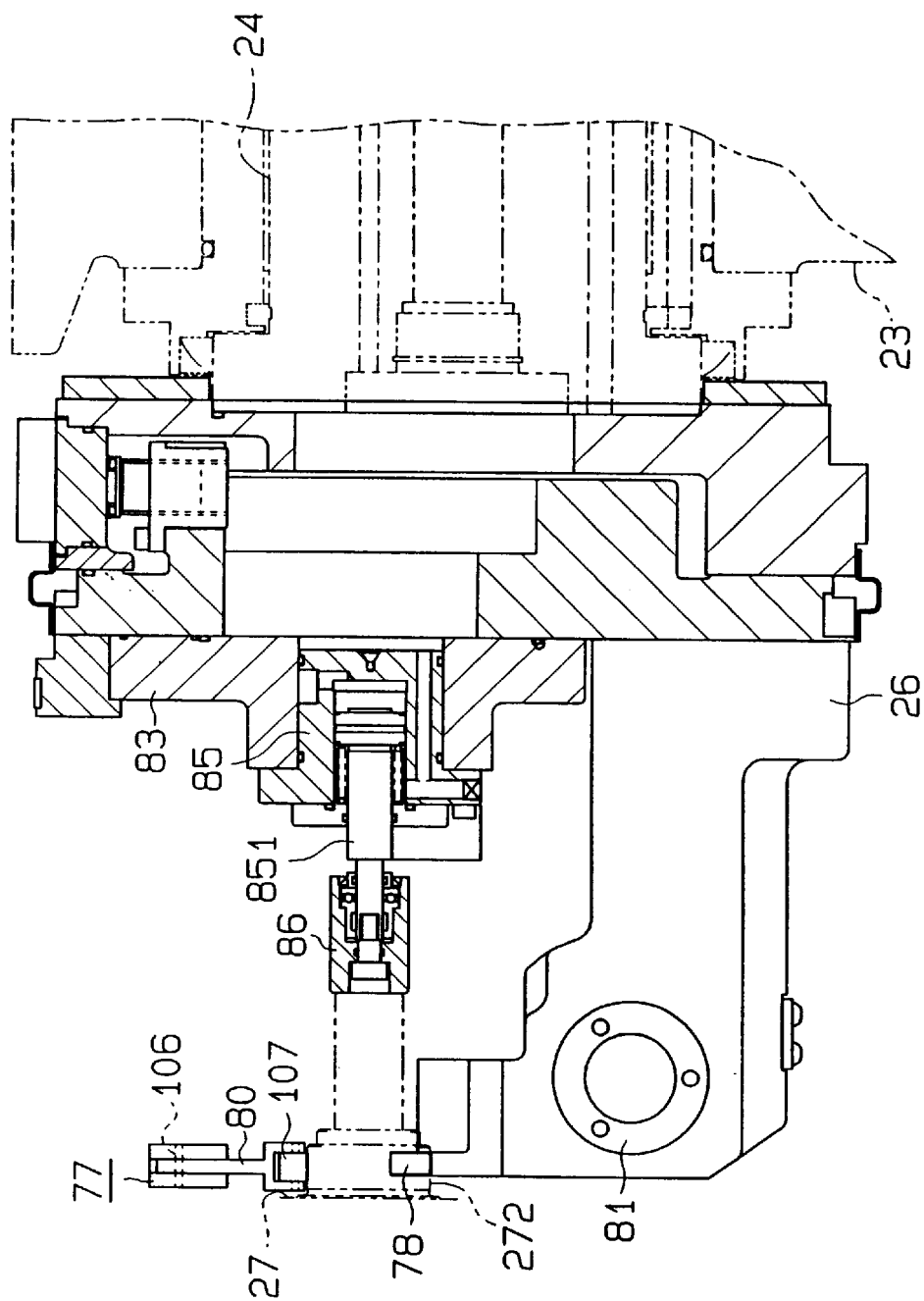
FIG. 7 is an enlarged vertical cross-sectional view of the major section showing a chuck in the tailstock.

As shown in FIGS. 7 and 8, the second chuck body 26 is made of a light-weight metallic material such as high-tension aluminum, and a clamping device 77 is attached to the front end of the second chuck body 26. This clamping device 77 is the same as that of the clamping device 47 of the first chuck body 25 and consists of a fixed clamp member 78, a pivotal arm 79, a movable clamp member 80, is a clamping cylinder 81 and a pivot turning device 99.

When the pivotal arm 79 is turned in the clamping direction by the clamping cylinder 81, the journal 272 of the crankshaft 27 is clamped between the fixed clamp member 78 and the movable clamp member 80 in alignment with the journal 271, which is located on the clamping device 47 side. When the pivotal arm 79 is turned in the unclamping direction by the clamping cylinder 81, the journal 272 of the crankshaft 27 is unclamped by the clamp members 78, 80.

A supporting block 83 is located at the front end of the driven side head 23 to move in a direction perpendicular to the axis of the main spindle 24.

A thrusting cylinder 85 for thrusting the crankshaft 27 is fitted in the supporting block 83 so that it is aligned with the axis of the phasing rotary shaft 53, and a piston rod 851 of the cylinder 85 rotatably supports a pusher 86 at its distal end. When the journal 272 of the crankshaft 27 is clamped by the clamping device 77 on the second chuck body 26, the pusher 86 is brought into pressing contact with the end face of the journal 272 under the thrusting motion of the thrusting cylinder 85. Thus, the crankshaft 27 pushes the tip of the engaging pin 67 of the restrictor 69, which is urged in the protruding direction by the spring 70 in the first chuck body 25, and engages with the pin 67 to be restricted to a predetermined position in the axial direction.

Next, the operation of the crank pin phase indexing apparatus thus constructed will be described.

In the initial state of the crank pin phase indexing apparatus, the main spindle 22 and the main spindle 24 are stopped at home positions, and the engaging pin 67, which is on the connector 66 connected to the phasing rotary shaft 53, is indexed to the initial phase position. When the piston 60 is advanced, the Curvic coupling 63 located between the first chuck body 25 and the phasing rotary shaft 53 is engaged, and the phase indexing shaft 39 is not locked by the locking mechanism 40.

In this state, the pivotal arms 49 and 79 of the chuck bodies 25, 26 are in the position 201 where the arms 49, 79 are wide open, as shown in FIG. 8, and a crankshaft 27 is located between the chuck bodies 25, 26 by a carrying mechanism (not shown). Then, the clamping cylinder 51 is operated to lower the pivotal arm 49 to the position 202 to temporarily rotatably support the crankshaft 27 at the journals 271 and 272 between the clamp members 48 and 50 and between the clamp members 78, 80 of the respective clamping devices 47, 77. When the engaging hole 68 formed on the end face of the journal 271 is engaged with the engaging pin 67, the crank pin 273 to be machined first is indexed to the axis of the main spindle 22 and the axis of the phase indexing shaft 39.

When the pusher 86 is advanced in the protruding direction by the thrusting cylinder 85, the crankshaft 27 is pressed against the seat 671 of the engaging pin 67 of the restrictor 69 to be restricted at a predetermined position in the axial direction. The motor 100 of the pivot turning device 99 is then driven to shift the center β downward, to turn the pivotal arms 49 and 79 to the position 203, and to clamp the journals 271, 272 of the crankshaft 27 non-rotatably between the clamp members 48 and 50 of the clamping device 47 and the clamp members 78 and 80 of the clamping device 77, respectively.

In this state, when the main spindle 22 and the main spindle 24 are rotated synchronously by the first drive motor 30 in the drive side head 21 and the second drive motor 73 in the driven side head 23, the chuck bodies 25 and 26. are rotated integrally with the main spindle 22 and the main spindle 24 about the axis of the main spindles 22, 24 and the axis of the phase indexing shaft 39. Thus, the crankshaft 27 supported between these chuck bodies 25, 26 is rotated about the axis of the first crank pin 273, and the circumference of the first crank pin 273 is machined using a tool (not shown) such as a grinding wheel.

When the crank pin 273 is machined, the rotation of the chuck body 25 is transmitted to the phasing rotary shaft 53 via the Curvic coupling 63, the connecting pin 62 and the engaging hole 611 of the piston 60, which are in engagement, in turn, via the Schmidt coupling 55 to the phase indexing shaft 39, and the shaft 39 is thus rotated.

When grinding of the first crank pin 273 is completed, as described above, rotation of the main spindle 22 and the main spindle 24 is stopped, and the motors 100 of the pivot turning devices 98, 99 are driven reversely to shift the center β upward in the drawings to pivot the pivotal arms 49 to the position 202, to slightly loosen the clamping of the journals 271, 272 by the clamping devices 47 and 77 so that the crankshaft can rotate. Further, the Curvic coupling 63 is disengaged to disconnect the first chuck body 25 from the phasing rotary shaft 53, and the locking mechanism 40 is also actuated to engage the locking pin 42 with the engaging hole 411 of the locking disc 41. Thus, the phase indexing shaft 39 and the phasing rotary shaft 53 are locked. Accordingly, in this state, the chuck body 25 is rotatable relative to the phasing rotary shaft 53.

In this state, when the main spindle 22 and the main spindle 24 are rotated synchronously by the drive motor 30 in the drive side head 21 and the drive motor 73 in the driven side head 23, respectively, the chuck bodies 25, 26 are rotated relative to the locked phasing rotary shaft 53 about the axis of the phasing rotary shaft 53 and about the axis of the main spindles 22 and 24. Thus, the crankshaft 27 is turned about the journals 271 and 272 via the engaging pin 67, and another crank pin 273 to be machined next is indexed to align with the axis of the main spindle 22. This indexing is carried out based on detection signals of rotational angles from the rotational angle detecting encoders 36, 74 of the drive motors 30, 73, respectively.

Subsequently, the motors 100 are driven to descend the pivotal arms 49, 79 to the position 203, the journals 271, 272 are non-rotatably clamped by the clamping devices 47 and 77, respectively. Further, the Curvic coupling 63 is engaged, and the locking mechanism 40 is opened to unlock the phase indexing shaft 39 and the phasing rotary shaft 53. In this state, the crank shaft 27 is rotated about the indexed crank pin 273, which is then subjected to grinding. Unprocessed crank pins are successively indexed to the axis of the main spindles 22, 24 and machined.

Accordingly, in the crank pin phase indexing apparatus of this embodiment, the first chuck body 25 is attached to the nose of the main spindle 22, which is rotated by the drive motor 30, and the phasing rotary shaft 53 is supported on the first chuck body 25 to rotate about an axis offset from the axis of the main spindle 22. Further, the phasing rotary shaft 53 and the first chuck body 25 are releasably connected via the coupling 63, and the rotation of the phasing rotary shaft 53 can be locked by the locking mechanism 40, which serves as a locking means. When a crank pin 273 is machined, the chuck bodies 25, 26 supporting the crankshaft 27 at the journals 271 and 272 are rotated together with the phasing rotary shaft 53 about the indexed crank pin 273. When the crank pin 273 is indexed, the chuck bodies 25 and 26 are rotated under the actions of the Curvic coupling 63 and locking mechanism 40 on the phasing rotary shaft 53 and are also rotated about the main spindles 22 and 24.

As described above, since the crank pin phase indexing apparatus is designed to carry out machining rotation and phase indexing without a differential gear mechanism, the construction of the phase indexing apparatus is simple and the overall size of the indexing apparatus is reduced. In addition, since the indexing apparatus has no differential gear mechanism having a multiplicity of gears, gear beating noises are eliminated, which improves the working environment. Further, the absence of a differential gear mechanism having a multiplicity of gears avoids, as much as possible, reduction in the machining accuracy caused by abrasion of gears.

Secondly, in the phase indexing apparatus according to this embodiment, the main spindle 22 and the phase indexing shaft 39 are arranged concentrically such that the shaft 39 shares the axis of the main spindle 22. Thus, since the phase indexing shaft 39 is housed in the main spindle 22, the entire unit is reduced in size. Further, the locking mechanism 40 for locking the phase indexing shaft 39 is located on the opposite end of the phase indexing shaft 39 from the chuck body 25 for chucking a workpiece. Accordingly, the chuck body 25 and the locking mechanism 40 are spaced away from each other to avoid complication of the structure.

Thirdly, in the crank pin phase indexing apparatus according to this embodiment, coupling between the phase indexing shaft 39 and the phasing rotary shaft 53 is achieved by the Schmidt coupling 55. Thus, the shaft-to-shaft distance between the phase indexing shaft 39 and the phasing rotary shaft 53, in other words, the distance between the main spindle 22 and the phasing rotary shaft 53 can be adjusted easily. Accordingly, the present indexing apparatus is compatible with crankshafts 27 having different crank pin strokes, which enables machining of various types of crankshafts 27.

Fourthly, in the crank pin phase indexing apparatus according to this embodiment, coupling of the phasing rotary shaft 53 with the chuck body 25 is achieved by a Curvic coupling 63 having the teeth 641, which engage with the teeth 651. Accordingly, connection between the phasing rotary shaft 53 and the chuck 25 is ensured without slippage.

Fifthly, in the crank pin phase indexing apparatus according to this embodiment, the teeth 641, 651 of the Curvic coupling 63 each have a trapezoidal cross section, and each tooth space has a triangular cross section. Accordingly, there is no interference between the crests of the teeth 641 and 651 with the bottoms of the tooth spaces when the teeth 641 are meshed with the teeth 651, and thus the meshing accuracy between the teeth 641, 651 and the bottoms of the tooth spaces is improved, which contributes to high-accuracy machining.

Sixthly, in the crank pin indexing apparatus of this embodiment, the first chuck body 25 and the second chuck body 26 are made of a metallic material such as a high-tension aluminum. This reduces the weight of the chuck bodies 25, 26 to reduce inertia, increases the rotational accuracy of the main spindles 22 and 24, and reduces imbalance in the shape of the chuck bodies 25, 26 to reduce irregular rotation.

Seventhly, in the crank pin indexing apparatus of this embodiment, the journal receiving faces 108 of the fixed clamp members 48, 78 are hardened to reduce abrasion of the faces 108. In addition, hard metal chips 109 are embedded on the journal receiving faces 108, which further reduces abrasion of the faces 108. Furthermore, since the chips 109 constitute the journal receiving faces 108, damage to the circumference of the journal 271 of the crank shaft 27 is prevented, and the chips 109 are prevented from chipping at the corners.

Eighthly, in the crank pin indexing apparatus of this embodiment, since the movable clamp members 50, 80 hold each journal 271, 272 at two positions with the aid of a pair of rollers 107, the clamping forces are concentrated toward the centers of the journals 271 and 272, respectively. Thus, backlash of the journals 271 and 272 is prevented resulting in stable clamping, which enables high-accuracy machining. Further, since the rollers 107 are supported on the movable clamp members 50, 80, which are pivotal with respect to the pivotal arms 49, 79, they securely hold the circumference of the journals 271, 272. When a crank pin is to be indexed, the rollers 107 are rolled following the rotation of the journals 271, 272, so that the crank pin can be indexed smoothly without resistance and with no slipping of the journals 271, 272 off the fixed clamp members 48, 78.

It is also possible to embody the present invention with the following modifications.

The second drive motor 73 in the driven side head 23 may be omitted to employ instead mechanical connecting means between the main spindle 22 and the main spindle 24, so that the spindles 22, 24 may be rotated integrally via the connecting means. This construction simplifies the structure.

Figure 14:
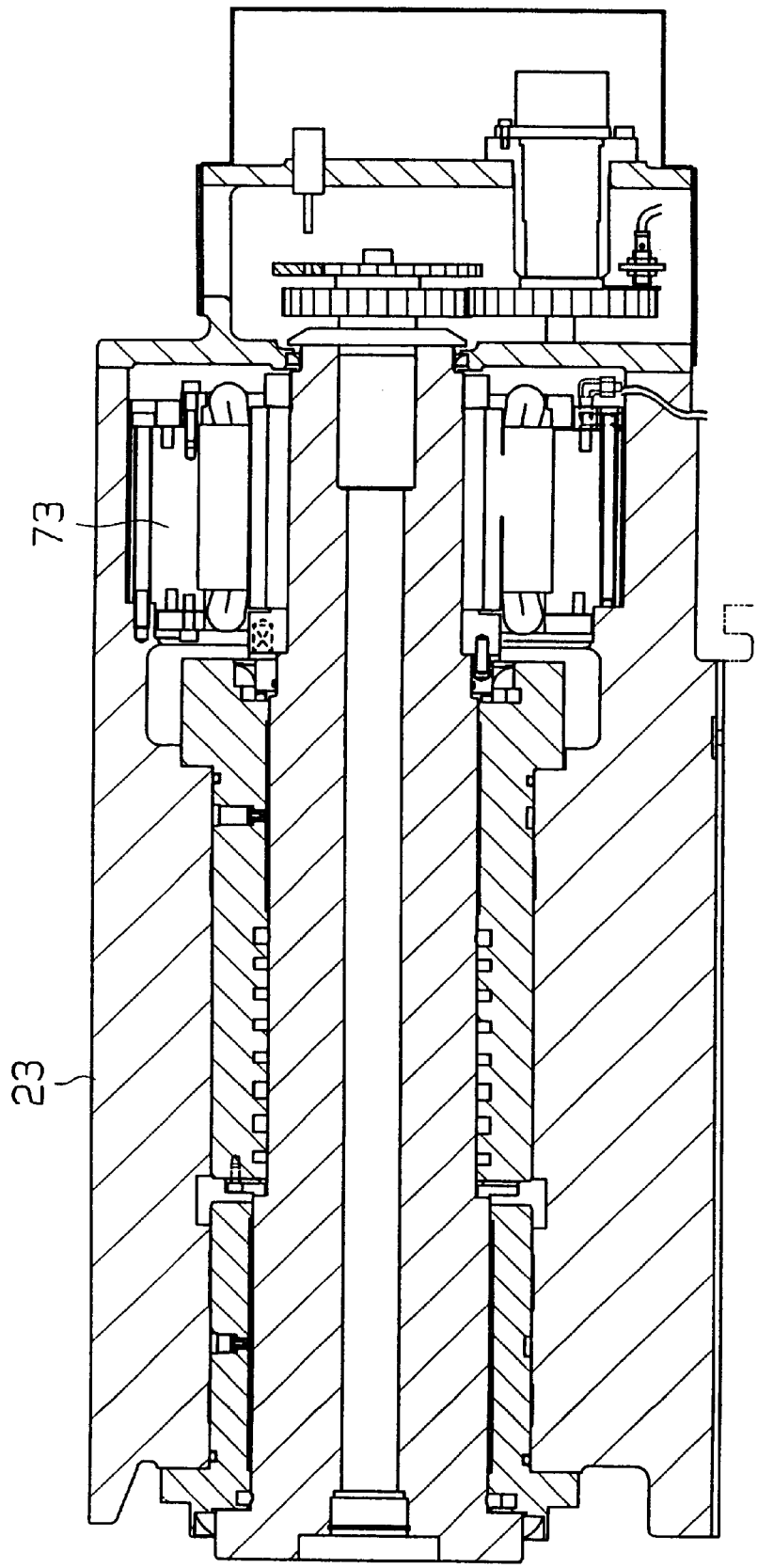
FIG. 14 is a cross-sectional view showing another embodiment.

While the first and second drive motors 30 and 73 are located on external sides of the drive side head 21 and the driven side head 23 in the foregoing embodiment, these motors 30, 73 may be a built-in type, which are located to surround the main spindles 22, 24, respectively, as shown in FIG. 14. Incidentally, the built-in type drive motor on the main spindle 22 side is not shown. This construction reduces the size of the entire unit.

Engagement and disengagement of the Curvic coupling 63 may be carried out using other drive means such as a solenoid.

The tooth spaces between the teeth 641 and between the teeth 651 of the Curvic coupling 63 may each have a trapezoidal cross section. In this case the crests of the teeth 641 and 651 do not contact the bottoms of the tooth spaces.

According to the present invention, since machining rotation and phase indexing are carried out without a differential gear mechanism, the construction of the unit is simple and the overall size of the indexing apparatus is reduced.

Further, since the phase indexing shaft shares the axis of the main spindle, the entire unit is smaller. Further, since locking of the phase indexing shaft is carried out on the opposite end of the phase indexing shaft from the chuck body for chucking a work, the structure is simpler.

The shaft-to-shaft distance between the phase indexing shaft and the phasing rotary shaft can be adjusted easily with the aid of a link coupling. Accordingly, various types of crankshafts can be machined.

Moreover, since a meshing coupling is employed in the present invention, the phasing rotary shaft and the chuck body can be connected securely without slippage. Further, the meshing coupling is located between the phasing rotary shaft and the front end of the chuck body, so that the rotation of the main spindle can be transmitted directly to the chuck, which contributes to high-accuracy machining.

Further, according to the present invention, abrasion of the journal receiving faces of the fixed clamp members is prevented by a hard metal, and since the hard metal does not protrude from the journal receiving faces, the journals are not damaged.

In addition, since each journal of a crankshaft is clamped at two positions in the circumferential direction with the aid of a pair of rollers, the force components are concentrated toward the centers of the journals. Accordingly, with the force components of the rollers directed toward the center of the journal, clamping is more stable.

What is claimed is:

1. A crank pin phase indexing apparatus comprising:
   a main spindle, which is driven by a drive motor, wherein the main spindle rotates about a main spindle axis;
   a chuck attached to the main spindle for holding an end of a crankshaft;
   a phasing rotary shaft connectable to the chuck, wherein the phasing rotary shaft rotates about an axis offset from the main spindle axis;
   a lock device for locking the phasing rotary shaft against rotation about its own axis, wherein the lock device includes a phase indexing shaft that is coaxial with the main spindle; and
   a releasable coupling for releasably connecting the phasing rotary shaft with the shuck, wherein the releasable coupling is a meshing coupling having a pair of opposed coupling plates, at least one of which is movable toward and away from the other, wherein each coupling plate has a set of teeth facing the opposite coupling plate such that the teeth of one coupling plate mate with those of the other coupling plate when the coupling plate are apart by a predetermined distance.

2. The crank pin indexing apparatus according to claim 1, wherein the phase indexing shaft is locked against rotation at one end and is connected to the phasing rotary shaft at the opposite end.

3. The crank pin indexing apparatus according to claim 1, wherein a link coupling is connected between the phase indexing shaft and the phasing rotary shaft, wherein the link coupling has an input-side axis and an output-side axis, and wherein the link coupling permits variation of the distance between the input-side axis and the output-side axis.

4. The crank pin indexing apparatus according to claim 1, wherein the releasable coupling is coaxial with the phasing rotary shaft and the chuck.

5. A crank pin phase indexing apparatus comprising:
   a main spindle, which is driven by a drive motor, wherein the main spindle rotates about a main spindle axis;
   a chuck attached to the main spindle for holding a first end of a crankshaft, the chuck including:
   a) a fixed clamp member for supporting the first end of the crankshaft at a fixed position;
   b) a movable clamp member that is opposable to the fixed clamp member; and
   c) a clamp driving means for moving the movable clamp member between a clamping position, at which the movable clamp member clamps the crankshaft against the fixed clamp member, and an unclamped position, at which the crankshaft is released;

a phasing rotary shaft connectable to the chuck, wherein the phasing rotary shaft rotates about an axis offset from the main spindle axis;

a lock device for locking the phasing rotary shaft against rotation about its own axis, wherein the lock device includes a phase indexing shaft that is coaxial with the main spindle; and a releasable coupling for releasably connecting the phasing rotary shaft with the chuck.

6. The crank pin phase indexing apparatus of claim 5 further comprising a pivot shaft for pivotally supporting the movable clamping member.

7. The crank pin indexing apparatus according to claim 5, wherein the phase indexing shaft is locked against rotation at one end and is connected to the phasing rotary shaft at the opposite end.

8. The crank pin indexing apparatus according to claim 5, wherein a link coupling is connected between the phase indexing shaft and the phasing rotary shaft, wherein the link coupling has an input-side axis and an output-side axis, and wherein the link coupling permits variation of the distance between the input-side axis and the output-side axis.

9. The crank pin indexing apparatus according to claim 5, wherein the releasable coupling is coaxial with the phasing rotary shaft and the chuck.

10. The crank pin indexing apparatus according to claim 5, wherein the releasable coupling is a meshing coupling having a pair of opposed coupling plates, at least one of which is movable toward and away from the other, wherein each coupling plate has a set of teeth facing the opposite coupling plate such that the teeth of one coupling plate mate with those of the other coupling plate when the coupling plates are apart by a predetermined distance.

11. A crank pin phase indexing apparatus comprising:

a pair of main spindles, each of which is driven by a drive motor, wherein each main spindle rotates about a main spindle axis;

a pair of chucks, one of which is attached to each main spindle for holding an end of a crankshaft, respectively, each chuck including:

a) a fixed clamp member for supporting the first end of the crankshaft at a fixed position;

b) a movable clamp member that is opposable to the fixed clamp member; and c) a clamp driving means for moving the movable clamp member between a clamping position, at which the movable clamp member clamps the crankshaft against the fixed clamp member, and an unclamped position, at which the crankshaft is released;

a phasing rotary shaft connectable to one of the chucks, wherein the phasing rotary shaft rotates about an axis offset from the main spindle axis;

a lock device for locking the phasing rotary shaft against rotation about its own axis, wherein the lock device includes a phase indexing shaft that is coaxial with the main spindles; and a releasable coupling for releasably connecting the phasing rotary shaft with the associated chuck, wherein the releasable coupling is a meshing coupling having a pair of opposed coupling plates, at least one of which is movable toward and away from the other, wherein each coupling plate has a set of teeth facing the opposite coupling plate such that the teeth of one coupling plate mate with those of the other coupling plate when the coupling plates are apart by a predetermined distance.

12. The crank pin indexing apparatus according to claim 11, wherein the phase indexing shaft is locked against rotation at one end and is connected to the phasing rotary shaft at the opposite end.

13. The crank pin indexing apparatus according to claim 11, wherein a link coupling is connected between the phase indexing shaft and the phasing rotary shaft, wherein the link coupling has an input-side axis and an output-side axis, and wherein the link coupling permits variation of the distance between the input-side axis and the output-side axis.

14. The crank pin indexing apparatus according to claim 11, wherein the releasable coupling is coaxial with the phasing rotary shaft and the chuck.

* * * * *